US011353274B2

(12) United States Patent
Lenert et al.

(10) Patent No.: US 11,353,274 B2
(45) Date of Patent: Jun. 7, 2022

(54) THERMAL MANAGEMENT SYSTEM

(71) Applicant: THE REGENTS OF THE UNIVERSITY OF MICHIGAN, Ann Arbor, MI (US)

(72) Inventors: Andrej Lenert, Ann Arbor, MI (US); Hannah Meekyung Kim, Canton, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 43 days.

(21) Appl. No.: 16/869,368

(22) Filed: May 7, 2020

(65) Prior Publication Data

US 2020/0355448 A1 Nov. 12, 2020

Related U.S. Application Data

(60) Provisional application No. 62/845,017, filed on May 8, 2019.

(51) Int. Cl.
| | |
|---|---|
| F28F 1/00 | (2006.01) |
| F28F 21/08 | (2006.01) |
| H02S 40/44 | (2014.01) |
| F28F 1/32 | (2006.01) |

(52) U.S. Cl.
CPC ............. F28F 21/089 (2013.01); F28F 1/32 (2013.01); H02S 40/44 (2014.12)

(58) Field of Classification Search
CPC ............ F28F 21/089; F28F 1/32; H02S 40/44
USPC ....................................................... 165/177
See application file for complete search history.

(56) References Cited

U.S. PATENT DOCUMENTS

| | | | |
|---|---|---|---|
| 6,497,444 B1 * | 12/2002 | Simon .................. | B62B 5/0013 296/83 |
| 2015/0168618 A1 * | 6/2015 | Nakajima .............. | G02B 5/282 359/359 |
| 2018/0252950 A1 * | 9/2018 | Hakemi ............... | C09K 19/544 |
| 2020/0007076 A1 * | 1/2020 | King ..................... | H02S 40/22 |

OTHER PUBLICATIONS

Fernandez, N., et al. "Energy Savings Potential of Radiative Cooling Technologies", US Department of Energy, prepared under Contract DE-AC05-76RL01830, PNNL-24904, Nov. 2015, 72 pages.
Hossain, M., et al. "Radiative Cooling: Principles, Progress, and Potentials", Advanced Science, 2016, 3, 1500360, 10 pages.
Zhai, Y., et al. "Scalable-Manufactured Randomized Glass-Polymer Hybrid Metamaterial for Daytime Radiative Cooling", Science, 355, 1062-1066 (2017), 5 pages.

* cited by examiner

*Primary Examiner* — Davis D Hwu
(74) *Attorney, Agent, or Firm* — Dierker & Kavanaugh, P.C.

(57) ABSTRACT

A thermal management system for a body to be exposed to solar radiation includes an infrared radiating element and a solar-scattering cover disposed on or integrated with the infrared radiating element.

13 Claims, 4 Drawing Sheets

THERMAL MANAGEMENT SYSTEM

CROSS-REFERENCE TO RELATED APPLICATIONS

This application claims the benefit of U.S. provisional application Ser. No. 62/845,017, filed May 8, 2019, the contents of which is incorporated by reference herein in its entirety.

BACKGROUND

Radiative cooling may alleviate urban heat island effects and decrease the energy requirements for building thermal regulation. Nevertheless, existing radiative cooling systems may be considered unsuitable for climates with low atmospheric clarity and high humidity levels.

New utility-scale solar photovoltaic (PV) installations are deploying tracking and bifacial-cell technologies because they improve efficiency, and in turn, decrease costs. The potential gain in efficiency is partly offset, however, by the higher operating temperatures associated with higher illumination levels. Higher operating temperatures may degrade both PV module efficiency (~0.4%/° C.) and module lifetime (~7%/° C.).

A passive approach to reduce the module operating temperature is to directly reject heat to Space, effectively at ~3 K. However, existing on-module radiative cooling approaches have not demonstrated more than 1° C. of additional temperature drop relative to a conventional glass-covered module.

INTRODUCTION

In a first aspect, a thermal management system for a body to be exposed to solar radiation comprises: an infrared radiating element; and a solar-scattering cover disposed on or integrated with the infrared radiating element.

In some examples of this first aspect, the solar-scattering cover is to scatter sunlight diffusely or directionally away from the body; the solar-scattering cover is substantially transparent to infrared radiation; and the infrared radiating element is to emit infrared radiation through the solar-scattering cover. In some examples, the solar-scattering cover comprises a nanostructured, IR-transparent polymer. In some examples, the nanostructured, IR-transparent polymer is nanostructured polyacrylonitrile (nanoPAN). In some examples, the solar-scattering cover includes a film, the film comprising the nanostructured, IR-transparent polymer. In some examples, the film comprises: a first layer including a first flexible polymeric material; a second layer disposed on the first layer, the second layer including the nanostructured, IR-transparent polymer; and a third layer disposed on the second layer, the third layer including a second flexible polymeric material, wherein the film is to be removably installed on the infrared radiating element. In some examples, the film is further to be reinstalled on the infrared radiating element after being removed from the infrared radiating element. In some examples, the nanostructured, IR-transparent polymer includes nanostructured polyacrylonitrile (nanoPAN). In some examples, the first flexible polymeric material includes polyethylene. In some examples, the second flexible polymeric material includes polyethylene. In some examples, the thermal management system further comprises a dielectric material disposed on or embedded in the nanostructured, IR-transparent polymer to increase solar scattering of the solar-scattering cover and to protect the nanostructured, IR-transparent polymer from ultra-violet radiation.

It is to be understood that any features of the thermal management system disclosed herein may be combined together in any desirable manner and/or configuration.

In a second aspect, a film to be disposed on an infrared radiating element, the film comprises: a first layer including a first flexible polymeric material; a second layer disposed on the first layer, the second layer including a selectively transparent polymeric material; and a third layer disposed on the second layer, the third layer including a second flexible polymeric material, wherein the film is to be removably installed on the infrared radiating element.

In some examples of this second aspect, the film is further to be reinstalled on the infrared radiating element after being removed from the infrared radiating element. In some examples, the selectively transparent polymeric material includes nanostructured polyacrylonitrile (nanoPAN). In some examples, the first flexible polymeric material includes polyethylene. In some examples, the second flexible polymeric material includes polyethylene.

It is to be understood that any features of the film disclosed herein may be combined together in any desirable manner and/or configuration. Further, it is to be understood that any combination of features of any aspects of the thermal management system and/or the film disclosed herein may be used and/or combined together in any desirable manner, and/or may be used and/or combined with any of the examples disclosed herein.

In a third aspect, a thermal management system for a photovoltaic (PV) power generator comprises: an infrared radiating element; a solar-scattering cover disposed on the infrared radiating element; and a thermal storage sub-system in fluid connection with a solar panel via thermal interconnections.

In some examples of the third aspect, the solar-scattering cover is to scatter sunlight diffusely or directionally toward an underside of the solar panel; and the solar-scattering cover is substantially transparent to infrared radiation to allow the infrared radiating element to emit infrared radiation through the solar-scattering cover. In some examples, the solar-scattering cover comprises a nanostructured, IR-transparent polymer. In some examples, the nanostructured, IR-transparent polymer is nanostructured polyethylene (nanoPE). In some examples, the nanostructured, IR-transparent polymer is nanostructured polyacrylonitrile (nanoPAN). In some examples, the thermal management system further comprises a dielectric material disposed on or embedded in the nanostructured, IR-transparent polymer to increase solar scattering of the solar-scattering cover and to protect the nanostructured, IR-transparent polymer from ultra-violet radiation. In some examples, the dielectric material is deposited on the nanostructured, IR-transparent polymer by physical vapor deposition or by a solution-based process, or embedded into the nanostructured, IR-transparent polymer by electrospinning. In some examples, the thermal storage sub-system is to shift and distribute a peak solar heat load over a twenty-four hour time period; the thermal storage sub-system is to store excess off-peak cooling for use during peak hours; the thermal storage sub-system is to store natural convection energy; and the thermal storage sub-system comprises a container to store a coolant. In some examples, the container is located under the infrared radiating element or the container is thermally connected to the infrared radiating element via the thermal interconnections. In some examples, the container is connected to the solar panel with a circulating coolant line or with heat pipes, wherein the heat pipes are stationary or wherein the heat pipes are to oscillate. In some examples, the thermal interconnections comprise a circulating fluid loop or a heat pipe. In some examples, the thermal interconnections are passive. In some examples, the dielectric material is selected from the group consisting of ZnS, ZnO, TiO2 and combinations thereof.

In some examples of the third aspect, the solar panel is a member of an array of tracking solar panels arranged in rows; the infrared radiating element is a solar-scattering radiator located between the rows of the array of tracking solar panels; a radiating area of the solar-scattering radiator is about equal to an area of the solar panel; the solar-scattering radiator is to work in tandem with natural convection from the array of tracking solar panels; and the thermal storage sub-system includes a ground-based liquid reservoir. In some examples, the thermal management system further comprises: a sun-facing surface defined on at least one member of the array of tracking solar panels; a distal surface defined on the at least one member of the array of tracking solar panels opposite the sun-facing surface; and a heat exchanger attached to the distal surface of the at least one member of the array of tracking solar panels. In some examples, the heat exchanger includes a serpentine tube; and the heat exchanger is to obscure less than 20 percent of the distal surface of the solar panel to which the heat exchanger is attached. In some examples, the array of tracking solar panels includes at least one bifacial solar panel. In some examples, the thermal interconnections include flexible tubing to fluidly connect the ground-based liquid reservoir to the serpentine tube, wherein the flexible tubing remains connected to the serpentine tube throughout a range of motion of a tracking solar panel in the array of tracking solar panels to which the serpentine tube is attached.

In some examples of the third aspect, the ground-based liquid reservoir is covered by the solar-scattering radiator. In some examples, the solar-scattering radiator includes: a layer of mirrored aluminum; a coating disposed on the layer of mirrored aluminum, the coating to absorb or emit radiation having wavelengths ranging from mid-wavelength infrared to long-wavelength infrared; and a solar scattering cover overlaid on the coating, wherein the solar scattering cover is substantially transparent to infrared radiation to allow the solar-scattering radiator to emit infrared radiation through the solar-scattering cover. In some examples, the coating is a selected from the group consisting of: polydimethylsiloxane (PDMS) or an other polymer; an inorganic material; and combinations thereof. In some examples, the coating is polydimethylsiloxane (PDMS). In some examples, the solar-scattering cover comprises a nanostructured, IR-transparent polymer. In some examples, the nanostructured, IR-transparent polymer is nanostructured polyethylene (nanoPE). In some examples, the nanostructured, IR-transparent polymer is nanostructured polyacrylonitrile (nanoPAN). In some examples, the thermal management system further comprises a dielectric material disposed on or embedded in the nanostructured, IR-transparent polymer to increase solar scattering of the solar-scattering cover and to protect the nanostructured, IR-transparent polymer from ultra-violet radiation. In some examples, the dielectric material is deposited on the nanostructured, IR-transparent polymer by physical vapor deposition or by a solution-based process, or embedded in to the nanostructured, IR-transparent polymer by electrospinning. In some examples, the dielectric material is selected from the group consisting of ZnS, ZnO, TiO2 and combinations thereof.

It is to be understood that any features of the thermal management system disclosed herein may be combined together in any desirable manner and/or configuration. Further, it is to be understood that any combination of features of any aspects of the thermal management system and/or the film disclosed herein may be used and/or combined together in any desirable manner, and/or may be used and/or combined with any of the examples disclosed herein.

BRIEF DESCRIPTION OF THE DRAWINGS

Features and advantages of examples of the claimed subject matter will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
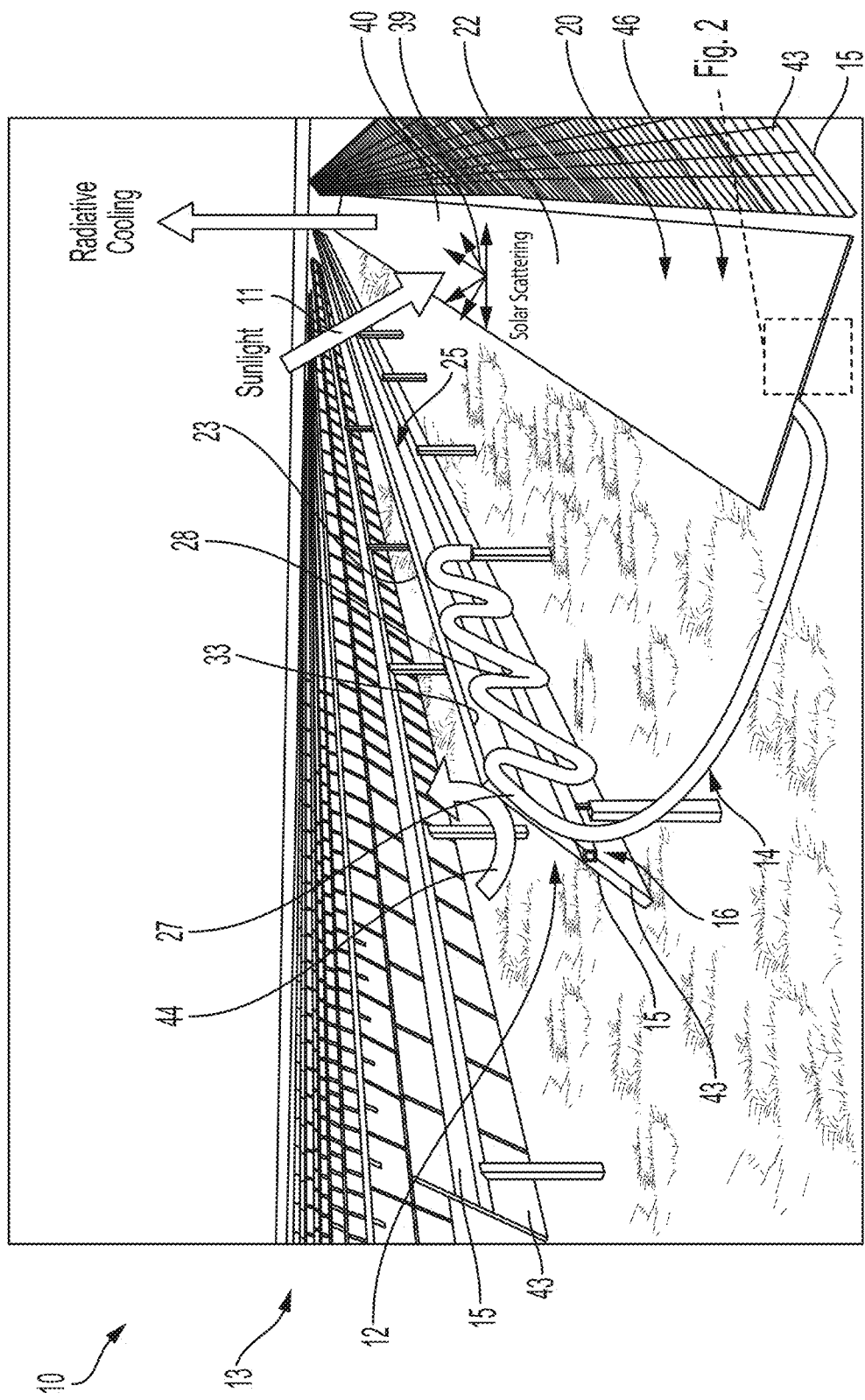
FIG. 1 is a schematic illustration depicting an example of a Radiation-Assisted PV Thermal management system according to the present disclosure.

Disclosed herein is a selectively transparent film including polyacrylonitrile (PAN) nanofibers that can be seasonally deployed over existing surfaces to enable radiative cooling during the summer, while allowing solar heating when removed during the winter. As disclosed herein, the morphology of the PAN nanofibers is tailored to exhibit high solar cross-sections. Such morphology decreases the amount of material needed and, in turn, causes the film to exhibit high infrared transmittance despite PAN's intrinsic absorption in the 8-13 μm range. As disclosed herein, beaded nanofiber electrospun film boosts the total solar reflectance on an unpolished aluminum surface from ~80% to nearly 99%. When scaled up and tested outdoors, the film shields a PDMS-coated aluminum sheet from solar radiation while allowing the PDMS-coated aluminum sheet to radiate heat to space, resulting in a 7° C. temperature drop under unoptimized sky conditions. Heat transfer modeling agrees with the outdoor experiments and predicts temperature drops exceeding 10° C. below ambient under standard sky conditions with the beaded nanofiber film. The flexible and freestanding nature of the film may allow it to be deployed seasonally in regions where it is favorable to reflect sunlight during warmer months but absorb solar heat during colder months. This would widen the geographical space where radiative cooling is applicable.

Passive radiative cooling is one approach that has the potential to alleviate urban heat island effects and decrease the energy consumed for building thermal regulation. This approach takes advantage of the atmospheric transparency windows in the infrared (3.4 μm-4.1 μm, 8 μm-13 μm, and 16 μm-28 μm) to allow terrestrial materials to radiate heat to Space (~3 K). As used herein, selectivity with respect to a radiator means the radiator can emit heat to Space while preventing absorption of solar irradiation. As used herein, "mid-wavelength infrared" refers to electromagnetic radiation having a wavelength from about 3 μm to about 8 μm. As used herein, "long-wavelength infrared" refers to electromagnetic radiation having a wavelength from about 8 μm to about 15 μm.

Before the present disclosure, radiative cooling approaches were best suited for climates with high atmospheric clarity and low humidity levels. In seasonal climates, a thermal management system, as disclosed herein, with two operational modes, would use less energy. In a first operational mode, the thermal management system radiatively cools during the summer. In a second operational mode, the thermal management system absorbs sunlight during the winter. The bimodal approach of the present disclosure could offset cooling and heating demands that are otherwise met using renewable electricity or fossil fuels.

According to the present disclosure, a selectively transparent film can be seasonally deployed over existing materials to lower their temperatures. A freestanding, selectively transparent film is a versatile device that can be placed in contact with an emitting/radiating surface or separated from the emitting/radiating surface by a transparent insulation layer. In examples, the film may include electrospun polyacrylonitrile (PAN) fibers, supported by thin polyethylene (PE) sheets. By tailoring the hierarchical morphology of the PAN structures, examples of the freestanding PAN-based film of the present disclosure may achieve greater than 95% solar-weighted total reflectance (SR) and greater than 70% atmospheric-window-weighted total transmittance (AWT). As such, the selectively transparent film can be paired with emitting/radiating surfaces that have relatively low solar reflectance. It is to be understood that many materials used in urban settings (e.g., concrete, asphalt, roofs, etc.) have relatively low reflectance. During warmer months, examples of the PAN film of the present disclosure can be deployed to provide passive radiative cooling. During colder months, when a solar-absorbing surface is favorable, the PAN film of the present disclosure can be easily removed and stored for later use.

In addition to being seasonally versatile, examples of the film of the present disclosure can provide optimized cooling regardless of the cooling power demand. When placed directly on the emitter/radiator, radiation can augment natural thermal regulation mechanisms such as conduction and convection to the environment. As disclosed herein, a thermal management system 20 having a combined operational mode, with conduction, convection, and radiation aspects, is useful for thermal management in applications where heat dissipation exceeds the radiative cooling power (e.g. solar panels). In low power applications, where sub-ambient temperatures are possible, a thermal break between the emitter/radiator and the environment can enable higher performance. In this scenario, the film 35 of the present disclosure can be a stand-alone cover or be paired in tandem with an IR-transparent insulator to decrease heat transfer between the emitter/radiator and warmer environment. The seasonal versatility and cooling power versatility of examples of the present disclosure provide enhanced utility in a wider range of climates.

Figure 2:
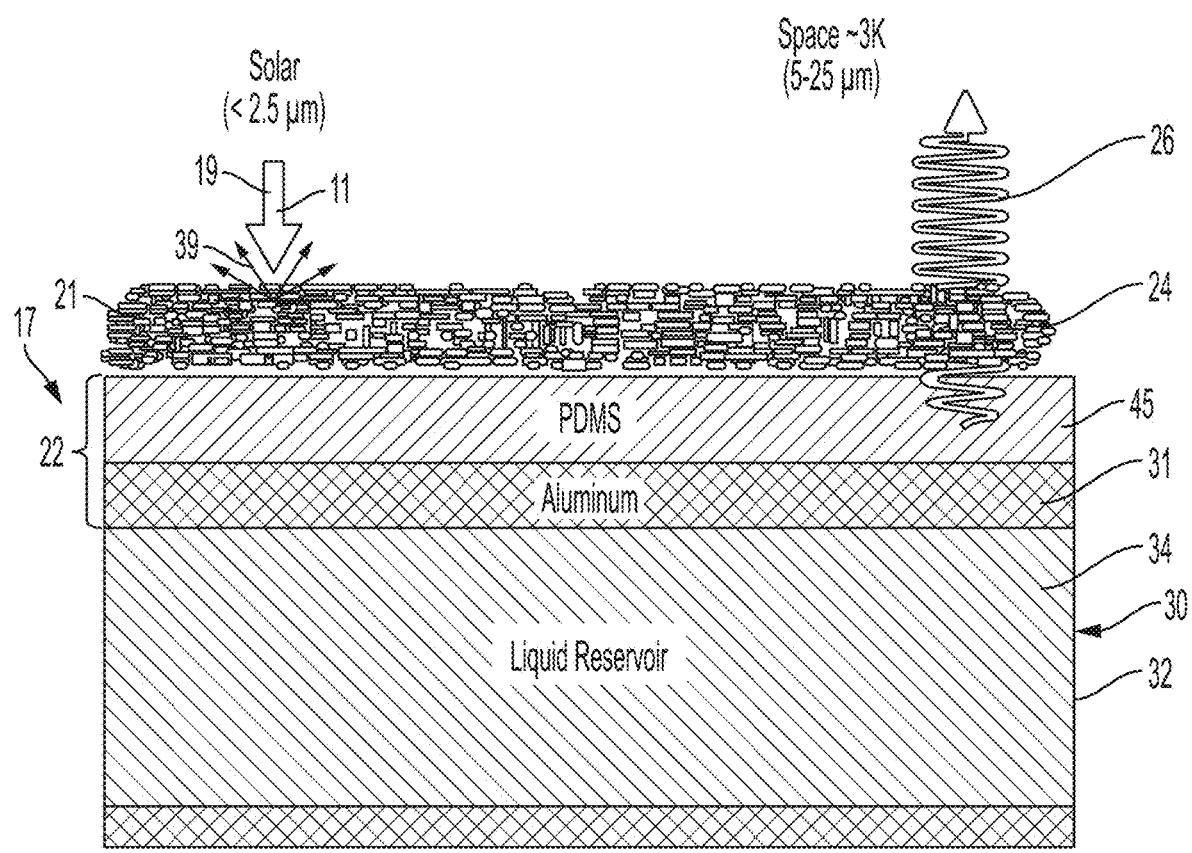
FIG. 2 is a schematic cross-sectional view of an example of a radiative cooler with a solar-scattering infrared-transparent nanostructured cover according to the present disclosure.

Referring to FIG. 2, in an example, a thermal management system 20 for a body 17 to be exposed to solar radiation 19, includes an infrared radiating element 22 and a solar-scattering cover 24 disposed on the infrared radiating element 22. In some examples, the solar-scattering element can be integrated with the infrared radiating element. It is to be understood that emission may occur partly from the solar-scattering element and partly from the infrared radiating element, thereby increasing cooling power. As used herein, a "body" means any structure. By way of non-limiting example, a body may include: a building, a roof, a wall, a window, a door, a hatch, a boat, an automobile, an airplane, a lighter-than-air vehicle; a machine, a housing, an electronic device, a solar panel, a container, a greenhouse, a swimming pool, a water reservoir, or combinations thereof.

In some examples of the thermal management system 20, the solar-scattering cover 24 may be to scatter sunlight 11 diffusely or directionally away from the body 17. The solar-scattering cover 24 may be substantially transparent to infrared radiation 26. As used herein, substantially transparent to infrared radiation means that at least 75 percent of the infrared spectrum passes through the solar-scattering cover 24 with less than a 25 percent attenuation of intensity. The infrared radiating element 22 may be to emit infrared radiation 26 through the solar-scattering cover 24.

Figure 3:
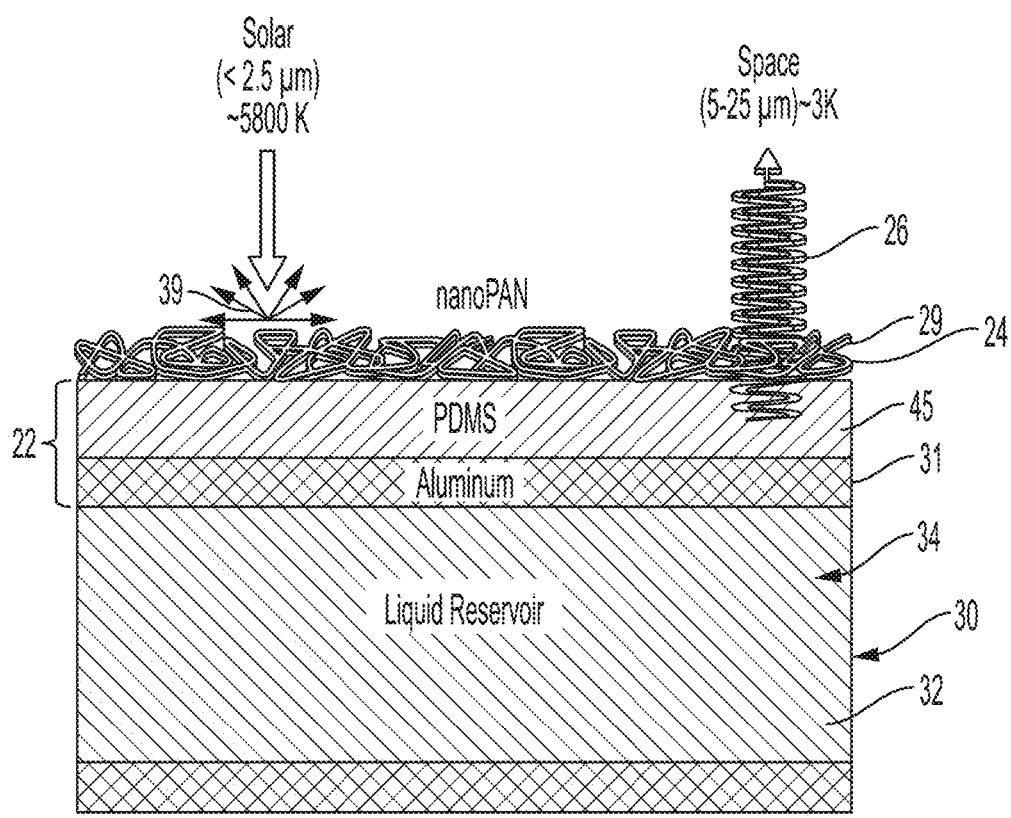
FIG. 3 is a schematic cross-sectional view of another example of a radiative cooler with a solar-scattering infrared-transparent nanostructured cover according to the present disclosure.

In some examples, the solar-scattering cover 24 comprises a nanostructured, IR-transparent polymer 21. In some examples, the nanostructured, IR-transparent polymer 21 is nanostructured polyacrylonitrile (nanoPAN) 29 (FIG. 3).

Figure 4:
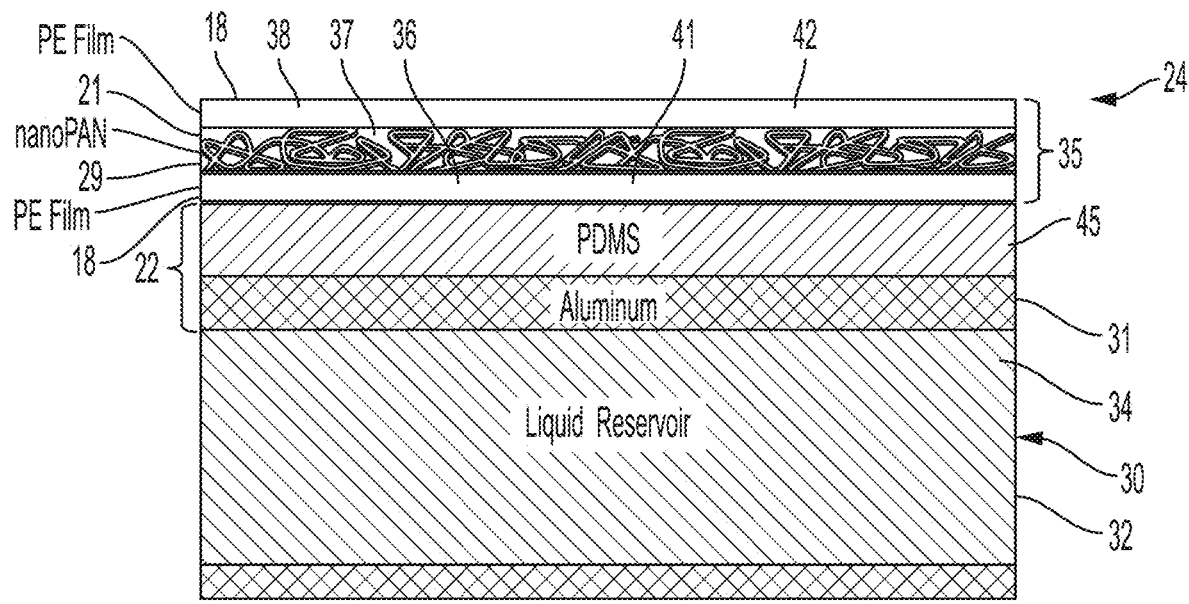
FIG. 4 is a schematic cross-sectional view of an example of a radiative cooler with a removable selectively transparent film according to the present disclosure.

Referring to FIG. 4, in some examples, the solar-scattering cover 24 includes a film 35; the film 35 includes the nanostructured, IR-transparent polymer 21. In some examples, the film 35 includes a first layer 36, a second layer 37, and a third layer 38. The first layer 36 may include a first flexible polymeric material 41. The second layer 37 may be disposed on the first layer 36. The second layer 37 may include the nanostructured, IR-transparent polymer 21. The third layer 38 may be disposed on the second layer 37. The third layer 38 may include a second flexible polymeric material 42. In an example, the film 35 is to be removably installed on the infrared radiating element 22. In some examples, the film 35 is further to be reinstalled on the infrared radiating element 22 after being removed from the infrared radiating element 22. In some examples, the nanostructured, IR-transparent polymer 21 includes nanostructured polyacrylonitrile (nanoPAN) 29. In some examples, the first flexible polymeric material 41 includes polyethylene. In some examples, the second flexible polymeric material 42 includes polyethylene. In examples, the first layer 36 may be a PE sheet 18. In some examples, the third layer 38 may also be a PE sheet 18. The first layer 36 and the third layer 38 may include the same materials, or they may include different materials. The first layer 36 and the third layer 38 may have the same thickness, or they may have different thicknesses. In some examples, the thermal management system 20 further includes a dielectric material disposed on or embedded in the nanostructured, IR-transparent polymer 21 to increase solar scattering of the solar-scattering cover 24 and to protect the nanostructured, IR-transparent polymer 21 from ultra-violet radiation.

Figure 5:
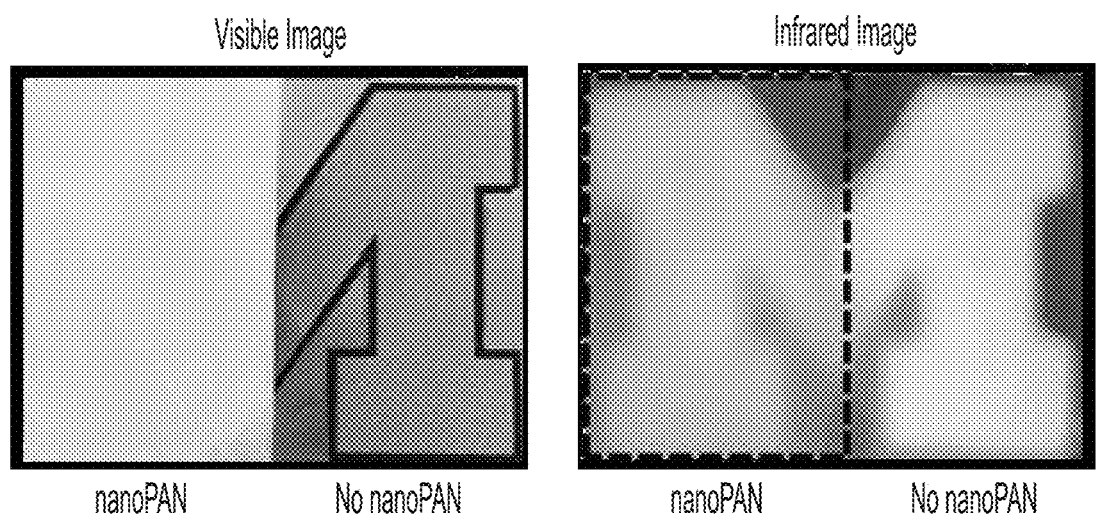
FIG. 5 is a photograph and infrared image of a solar-scattering infrared-transparent nanostructured cover depicted in FIG. 4 showing visible opacity on the left and infrared transparency on the right.

FIG. 5 is a photograph and infrared image of a solar-scattering infrared-transparent nanostructured cover depicted in FIG. 4 showing visible opacity on the left and infrared transparency on the right. A Block M was covered on the left side of the Block M by a solar-scattering cover 24 (see FIG. 4). The solar-scattering cover 24 (FIG. 4) includes the film 35 (FIG. 4). The film 35 includes nanoPAN 29. The left side of FIG. 5 is a visible light photograph. The right side of FIG. 5 is an infrared image. FIG. 5 demonstrates that the nanoPAN is opaque to visible light, and substantially transparent to infrared light.

As disclosed herein, fiber morphology affects the scattering and absorption properties of the selectively transparent films. The fiber morphology may be modified by varying the polymer concentration in the electrospinning solution. As disclosed herein, scattering mechanisms were unexpectedly and fortuitously discovered by experimental studies combined with electromagnetic simulations.

To further illustrate the present disclosure, an example is given herein. It is to be understood that this example is provided for illustrative purposes and is not to be construed as limiting the scope of the present disclosure.

Example

To demonstrate the versatility of present disclosure, the selectively transparent cover is combined with an unpolished aluminum sheet. For outdoor testing, the aluminum sheet is coated with polydimethylsiloxane (PDMS) to increase its thermal emittance. Without the nanoPAN film, the unpolished aluminum sheet has ~80% SR. With the PAN film, the SR increases to nearly 99%.

The morphology of polymer fibers may be controlled by tuning various spinning parameters in an electrospinning process. Voltage, polymer concentration, spin time, stage height, flowrate, and syringe gauge are all parameters that can affect the resulting electrospun fiber. In an example, the polymer solution concentration and spin time may be varied while keeping all other variables constant. The polymer solution concentration and spin time may be the simplest to tune to change fiber morphology and film thickness. PAN concentration directly influences the solution viscosity which influences the morphology of the spun fibers. Spin time influences the mass deposited, which in turn, affects the optical thickness. Ideally, the film needs to be thick enough to attenuate solar rays before they reach the emitter, but thin enough to be transparent in the infrared and enable heat exchange with Space.

In some examples, high-purity polyethylene (PE) may be used as a convection cover for passive radiative cooling. The simple chemistry of PE $(C2H4)n$ means that absorption peaks only occur for C—H and C—C bonds, resulting in high transmission in the infrared. PAN is more absorptive in the IR than polyethylene due to its extra triple nitrogen bond $(C3H3N)n$ and has never been reported as being used as a passive radiative cooling cover. Nonetheless, PAN was fortuitously chosen. PAN is compatible with electrospinning, unlike PE which requires additional heating and solvent treatment to enhance its electrostatic properties. By tailoring the morphology using electrospinning, a decrease in the amount of material needed to achieve high SR while retaining high AWT was discovered.

Four different concentrations of PAN dissolved in dimethylformamide (DMF) were prepared and electrospun onto transparent PE films: 2.5 wt %, 5 wt %, 7 wt %, 9 wt %. The resulting nanoPAN films were qualitatively opaque in the visible region but transparent in the IR. These are advantageous traits to scatter solar radiation but allow emission in the atmospheric windows. The 2.5 wt % and 5 wt % concentrations both resulted in a beaded fiber morphology, while the 7 wt % and 9 wt % concentrations produced cylindrical fibers. For low concentrations and viscosities, high surface tension causes instabilities in Taylor cone formation resulting in droplets and bead formation. When the concentration is increased, viscous forces dominate resulting in more uniform cylindrical fibers.

To protect the nanoPAN films and prevent the nanoPAN from sticking while handling, the nanoPAN may be sandwiched between two transparent PE sheets. The resulting freestanding film can either be used as a convective cover or applied directly on the emitter depending on the cooling application. In both applications the transparency of the fiber films in the infrared enables the heat exchange with Space. The AWT decreases with increasing concentrations of PAN. This effect may be attributed to the increase in area density (i.e., mass per area) of PAN with increasing concentration (electrospinning time is held constant). The increase in area density may lead to a decrease in infrared transparency, consistent with the Beer-Lambert law. This effect is also corroborated by the AWT results with increasing fiber thickness for a fixed PAN concentration.

In addition to the infrared properties, solar reflectance of the PAN film enhances daytime radiative cooling and seasonal thermal management. UV-Vis measurements show that a beaded 5 wt % PAN fiber (freestanding film) has a solar reflectance of 95%, which is the highest across the samples in the present disclosure, despite the intermediate area density. The infrared and solar specular measurements for the 5 wt % PAN, 720 μm thick film matches both the atmospheric transparency and solar irradiance spectrum. Although the beaded 5 wt % PAN film had nearly the same area density as a cylindrical 7 wt % film, its SR and AWT values were substantially higher.

To demonstrate why the beaded fiber morphology exhibits higher solar reflectance, SCUFF-EM simulation was used to compare the electromagnetic response of this composite structure to its constituent structures (bead, cylinder). The beaded morphology results in a higher scattering cross-section compared to a uniform cylindrical fiber. The dielectric nanostructures exhibit scattering resonances when their size is comparable to the wavelength of light, consistent with Mie theory. Increasing the diameter leads to a red shift of the scattering peak for cylinders. In the case of a beaded morphology, the resulting cross-section can be largely explained by a sum of the individual cross-sections of the bead and cylinder. It is to be understood, however, that the combination of structures and length scales in the beaded fiber morphology results in a higher solar-weighted scattering efficiency than either the fiber or bead alone. This may be due to the smaller geometrical cross-section of the beaded fiber than the sum of the constituent structures (due to overlapping volumes in the beaded fiber). The cylindrical fibers scatter shorter wavelengths due to their thinner diameters, while the beads primarily scatter in the near-IR due to their larger characteristic length scale. Thus, electrospinning provides a means to include cylindrical and bead morphologies in a mechanically interconnected system and take advantage of both dielectric micro/nanostructures.

In addition to morphological effects, polydispersity can also be responsible for broadening the overall solar reflectance. Both the 7 wt % (cylinder) and 5 wt % (beaded) films feature relatively broader particle size distributions compared to the 9 wt % (thicker cylinder) and 2.5 wt % samples (thinner beaded). However, the 5 wt % beaded morphology exhibits notably higher SR than the 7 wt % cylindrical geometry, suggesting that polydispersity cannot entirely explain the difference in SR.

Outdoor Tests

Outdoor tests were conducted to validate heat transfer models and to test whether the nanoPAN-based configurations can outperform conventional roofing materials and existing commercial films under realistic sky conditions. Based on the UV-Vis and Fourier Transform Infrared (FTIR) results, discussed above, the beaded morphology (5 wt % PAN) was chosen as the best candidate for daytime cooling. An unpolished aluminum sheet (Al) was chosen as a conventional roofing surface that is unoptimized for radiative cooling. The stagnation temperature of three emitter systems (Table 1) was simultaneously monitored under clear sky conditions in Ann Arbor, Mich.

TABLE 1

Description of emitter-cover systems tested outdoors

| System label | I unpolished Al | II with nanoPAN | III ESR control |
|---|---|---|---|
| Emitter | PDMS-coated unpolished aluminum | beaded PAN nanofibers deposited onto Al-PDMS emitter | ESR film adhered to an aluminum sheet |

Figure 6:
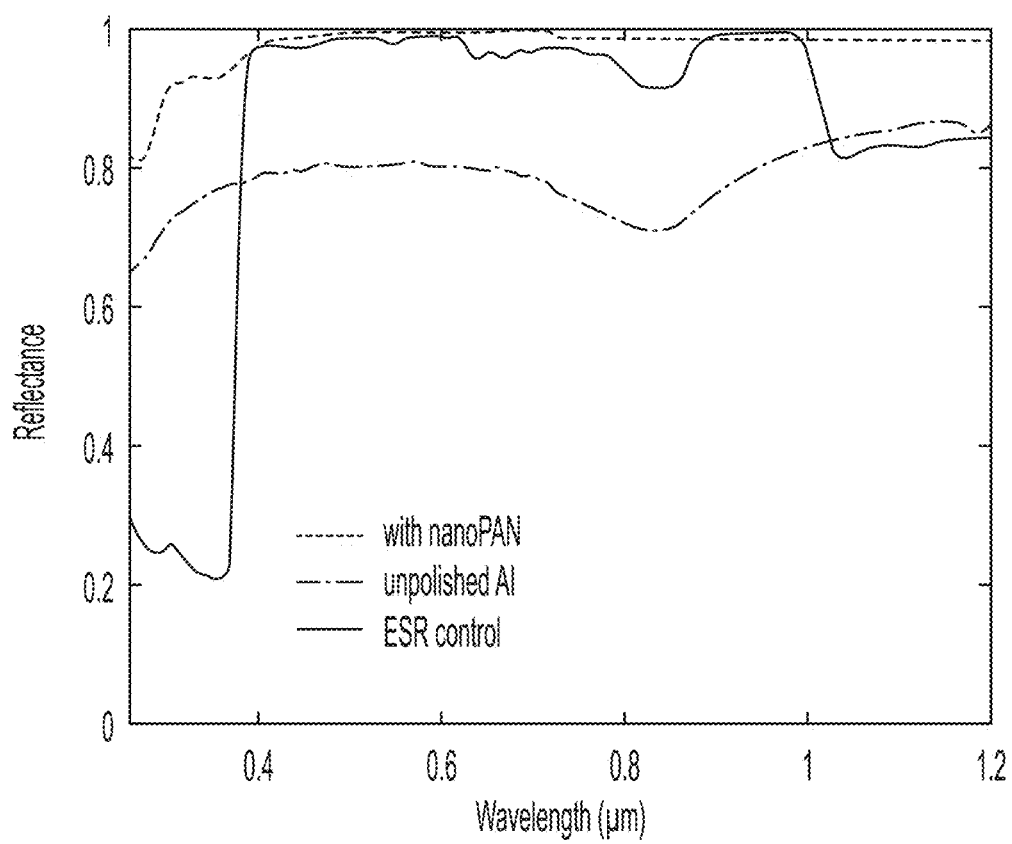
FIG. 6 is a graph depicting reflectance spectra for the samples listed in Table 1 as disclosed herein.

FIG. 6 is a graph depicting reflectance spectra for the samples listed in Table 1 above. FIG. 6 depicts total reflectance of the ~6 cm$^2$ emitters fabricated using electrospinning. These results were used in the "standard clear sky" heat transfer model of cooling power versus emitter temperature for the (I) unpolished Al, (II) with nanoPAN, and (III) ESR control samples listed in Table 1. FIG. 6 shows that sample II (with nanoPAN) had the highest SR, and sample I (unpolished Al) had the lowest SR.

Outdoor Test Results

The outdoor test results show that the unpolished aluminum (sample I) exhibited the highest temperature (20.1° C.) due to its low solar reflective properties (SR=80%). In contrast, the coldest average temperature was achieved with the "with nanoPAN" configuration (II)system which also resulted in lower absolute temperatures than the Enhanced Specular Reflector (ESR) control (sample III). Furthermore, by shielding the unpolished aluminum with the nanoPAN film, a ~7° C. temperature drop was observed because of the high SR of the nanoPAN film. Further, placing the nanoPAN film over a calibrated blackbody surface under AM1.5G 1-sun irradiation resulted in a 38.5° C. reduction in stagnation temperature.

The outdoor stagnation temperature measurements agree with the semi-empirical heat transfer model. Inputs to the heat transfer model include measured optical properties of the covers and emitters (for example, see FIG. 6), measured thermal insulation of the housing (i.e., thermal resistance between the emitter and the surroundings), ambient temperature, and the solar orientation. Small differences between the model and the experimental stagnation temperatures can be attributed to humidity and cloud coverage, which are not explicitly taken into account in the model.

It is to be understood that these results should not be interpreted as the best possible cooling performance that the present disclosure can achieve because during scale up from 5.9 cm$^2$ samples, which had ~99% SR, to wafer-scale covers (38.5 cm$^2$) used for outdoor measurements, a decrease in SR due to non-uniform deposition was observed. Furthermore, the average ambient temperature during the reporting window was 14° C., which suppresses the radiative cooling power relative to conditions with warmer ambient temperatures. Nevertheless, the results demonstrate that the addition of scattering fibers, albeit unoptimized, onto an unpolished surface resulted in better performance than the highly reflective ESR control.

Fabrication of Polymer Films

PAN fibers were fabricated using a home-built electrospinning setup. PAN powder with a MW of 200,000 (Polysciences, Inc.), was dissolved in dimethylformamide (Sigma) for a 2.5, 5, 7, and 9 wt % concentrations and mixed at 40° C.-50° C. overnight or until the powder was fully dissolved. Below 2.5 wt %, the solution was not viscous enough to support fiber formation, while above 9 wt %, the solution was too viscous. The solution was loaded into a syringe with a 25-gauge blunt tip needle and placed in a syringe pump to ensure a constant flowrate. The PAN solution was electrospun at a flow rate of 0.4 mL/hr and stage height of 11.5 cm for 10, 20, 40, and 60 minutes. The voltage was adjusted for each concentration to ensure formation of a Taylor cone. The substrates consisted of PDMS on aluminum emitter and PE plastic wrap placed over aluminum for grounding. Post fabrication treatment included leaving the films to rest overnight and carefully placing a clean PE plastic wrap on top of the exposed PAN fibers as a protective layer.

Fabrication of PDMS Emitters

The sides of aluminum weigh boats were removed and used as substrates for the unpolished aluminum surfaces. A 10:1 base elastomer to curing agent was used to make the pre-cured PDMS mixture. A 100 μm layer of PDMS was deposited on the aluminum substrate by spin coating at 700 rpm for 30 seconds and curing at 80° C. for 24 hours. Commercially available 3M Vikuiti™ ESR reflective emitters were purchased and placed over an aluminum substrate as a control.

Optical Measurements and Microscopy

The optical properties of the film were measured using UV-Vis and FTIR spectrometers with integrating sphere attachments. Total reflectance was measured from 0.3-1.2 μm using a Shimadzu UV-3600 Plus UV-Vis. Total infrared transmittance and reflectance was measured from 2-18 μm using a Cary 670 benchtop FTIR. Optical measurements were taken for both free-standing PAN fibers and emitters. Fiber morphology was visualized using the TESCAN MIRA3 scanning electron microscope. Bead and fiber diameter distributions were analyzed using the TESCAN images.

Scuff-EM Model

The scattering cross-sections of the cylindrical and beaded fiber morphologies were computed numerically with an open-source software implementation of the boundary-element method (BEM). Mesh-refinement was completed to ensure accurate results at smaller wavelengths. The BEM was verified by comparing the results to an analytical solution for Mie scattering via a PAN microsphere.

Outdoor Measurements

Outdoor tests were taken over 24-hour periods in Ann Arbor, Mich. when there was minimal cloud coverage. The emitter temperature, ambient temperature, and humidity were logged as a function of time for the emitter samples and a 3M ESR emitter control. Emitter temperatures were measured using T-type thermocouples and Extech SDL200 datalogger while transient ambient temperatures and humidity were logged using an OMEGA OM-24 logger. The emitters were placed in a foam enclosure to prevent bottom and side heating and the outside of the foam enclosure was wrapped with reflective Mylar®. An infrared transparent cover consisting of polyethylene (Glad® Cling Wrap) was placed taut over the emitter as a convective cover.

Examples of the thermal management system of the present disclosure may be combined with solar panels (i.e. photovoltaic (PV) modules). A Radiation-Assisted PV Thermal (RAPT) management system is disclosed herein.

Examples of the RAPT system disclosed herein may help regulate PV module temperature while enhancing back-side illumination levels for bifacial PV modules. Examples of the RAPT system disclosed herein may continuously maintain solar modules/panels at 7.5 (+/−15)° C. above the average daytime ambient temperature. According to the present disclosure, the RAPT system accomplishes this by (i) disposing a solar-scattering radiator as disclosed herein between the rows of tracking solar arrays (equal in the area as the arrays) and (ii) advantageously applying stored nighttime radiative cooling/convection using a liquid reservoir. The radiator provides an average cooling rate of about 120 W/m$^2$ by emitting heat through the atmosphere's infrared (IR) transparency bands. The radiator works in tandem with natural convection from the above-ambient PV modules, which provides an additional average cooling rate of about 160 W/m$^2$. Assumptions for this calculation are shown in Table 2:

TABLE 2

Assumptions for calculations

Temperatures:

proposed radiator/reservoir/panels: 32.5 +/− 2.5° C.;
average daytime ambient: 25° C.;
average nighttime ambient: 18° C.;
current panel (power-output-weighted): 49° C.
Radiator:

80% radiator capacity factor (daytime and nighttime);
radiating area matches panel area.
Liquid loop and reservoir:

pressure drop calculated based
on 8 m pipe length per 1 m$^2$ of
panels (¼ in. diameter);
coolant: glycol-water mixture;
5 cm reservoir depth;
reservoir: aluminum container;
85% liquid pump efficiency
Natural convection:

heat transfer coefficient (20 W/m$^2$K) is
based on empirical data for on-sun temperature
rise (~25 C.) and on-sun heat dissipation
rates (~500 W/m$^2$) of
representative panels.
Solar panels/farms:

15% average solar reflectance; 20% power
conversion efficiency at room temperature
(projecting to 2025); 50% panel area
coverage; 30% solar capacity factor;
all-in installation
costs $0.7/W$_e$ (projecting to 2025).

Together, these two nearly continuous modes of heat transfer exceed the on-sun heat gain by the solar panels as long as excess nighttime cooling energy is stored in the liquid reservoir and circulated during the day. The pumped coolant heat exchanges with the panels using a rear-mounted serpentine tube (covering <6% of the panel area for compatibility with bifacial cells). Flexible tubing connects the reservoir to the rear-mounted coolant lines and allows the panels to track freely. The power consumed for circulating the coolant is less than about 5% of the panel output power.

In an example, the RAPT system is applied for PV system cooling. The RAPT system may decrease average module temperatures by 15-20° C. (power-output weighted) and buffer temperature swings. The decreased average module temperatures may translate into a 6-8% increase in module power output and efficiency (based on the crystalline Si temperature coefficient). Based on the temperature drop, RAPT may also improve PV module reliability and extended lifetimes that surpass Department of Energy (DOE) targets (>30 years).

A Levelized Cost of Energy (LCOE) analysis was performed to determine the allowable additional cost for the RAPT system while maintaining a baseline LCOE of 0.056 $/kWh (25 yr baseline lifetime). The LCOE analysis applied an LCOE calculator developed by the National Renewable Energy Laboratory (NREL) and a market overview organized by NREL to establish the baseline cost for a photovoltaic Megawatt (MW) facility. The estimated 7.2% efficiency gain and prolonged lifetime (30 years) are worth over $50/m$^2$ (or ~25 cents/Watt) even when accounting for higher operation and maintenance costs ($2.00/kW/year increase).

The projected cost of goods for the RAPT system disclosed herein is about 3-5 US Dollars ($)/m$^2$. The projected cost of goods allows for a sufficient budget for installation and maintenance if those tasks are coordinated/integrated with the overall solar farm. Further economic benefits are expected for next-generation high-efficiency PV modules. Bifacial solar modules can particularly benefit from RAPT system as disclosed herein by leveraging scattered sunlight by the cover for an additional 5-10% relative increase in efficiency. Furthermore, panel thermal stability may also facilitate the commercialization of emerging PV technologies, such as tandems and perovskites, which are expected to be more susceptible to temperature swings.

In some examples, the RAPT system of the present disclosure may be implemented in off-the-grid applications requiring cooling such as atmospheric dew harvesting, cold storage, etc.

In some examples, the RAPT system of the present disclosure may be implemented in passive cooling of roofs for thermal management and air conditioning of buildings.

In some examples, the RAPT system of the present disclosure may be implemented in energy efficient cooling of wireless infrastructure.

The inventors of the present disclosure have unexpectedly and fortuitously discovered the solar-scattering radiator and the integrated cooling storage of the RAPT system as disclosed herein. Some existing radiative cooling approaches can be characterized as (Type A) photonic/optical modifications of the PV module or architecture, or (Type B) stand-alone radiative cooling systems. Existing PV-integrated systems (Type A) have not demonstrated more than about 1° C. temperature reduction compared to conventional glass covers. The existing Type A systems may typically include undesirable modification of the panel manufacturing process. The overall benefits of existing Type A approaches may be limited by the fact that the instantaneous solar heating rates (~0.5 Suns) are significantly higher than radiative cooling rates (~0.1 Suns). As disclosed herein, RAPT systems may overcome the ratio of rates of instantaneous solar heating to radiative cooling and improve temperature stability. As disclosed herein, the RAPT system utilizes the area between the PV panel rows and extends the duration of cooling by advantageously applying stored nighttime radiative/convective cooling.

Some existing stand-alone radiative cooling systems (Type B) may rely on thermally-emitting thin coatings on top of a solar-reflective substrate. Such Type II radiators may reflect sunlight at (or below) the thermal emitter leading to parasitically absorbed sunlight and limited cooling rates.

As shown in FIG. 2, unlike the stand-alone radiative cooling systems, some examples of the RAPT radiator disclosed herein include a ZnS-coated nanostructured polyethylene (nanoPE) layer to scatter sunlight near the top of the cover 24. Examples of the radiative cooler disclosed herein may include a solar-scattering infrared-transparent nanostructured cover 24 (ZnS-coated nanoPE) which blocks solar heat from reaching the thermal emitter (infrared radiating element) 22 (PDMS-coated mirrored Al).

In some examples, PDMS can be interchanged for a combination of other polymers such as TPX, polyimide, or rubber, as well as oxides such as silica and alumina, while maintaining the desired near-blackbody thermal emittance. The inverted structure of the RAPT radiator (top: scatters sunlight, bottom: emits IR) partially decouples regions that scatter sunlight from regions that emit heat. The high refractive index of ZnS enhances the scattering properties of the nanoPE. The nanoPE may exhibit relatively high total solar transmittance (~40%) without ZnS enhancement based on preliminary measurements as disclosed herein. Examples of the RAPT system disclosed herein compared to existing non-radiative systems may advantageously be dry (unlike evaporative cooling) and more passive (i.e. have negligible power consumption). Examples of the RAPT system disclosed herein may be integrated with other (i.e. non-RAPT) thermal management systems.

Referring to FIG. 2, in some examples, the cover 24 has a low thermal conductivity coefficient and blocks incoming solar radiation with wavelengths <8 μm. The nanoparticle size and layer thickness of the cover are tuned to allow transmission in the infrared spectra between 8-13 μm which is ideal for transmission of the waves through the atmosphere and into Space. The cover material can include BaF2, ZnS, and polyethylene. TiO$_2$ and polyacrylonitrile (PAN) may also be included in the cover 24.

In examples of the present disclosure, the radiators 22 can be tilted by 10-15 degrees without loss of radiative power to enhance roll-off of rainwater and particulates. In some examples, hydrophobic coatings may be applied to promote self-cleaning.

FIG. 1 depicts a schematic view of an example of a Radiation-Assisted PV thermal management system 20 as disclosed herein. The ground-based radiative cooler 46 provides continuous cooling of modules (solar panels 12). The liquid reservoir 34 stores the excess nighttime radiative/convective cooling energy and releases it during daytime operation. The liquid reservoir 34 may have thermal insulation disposed on at least portions thereof. The nanostructured cover and emitter are connected to a shallow liquid reservoir 34 placed behind a solar array. A pump circulates the coolant to tubes 27 behind the active components of the solar panel 12. The coolant returns to the liquid reservoir 34 and is cooled by the emitter (infrared radiating element) that passes the heat into the atmosphere and through the atmosphere to Space. The energy required to operate the pump and emitter are provided by the solar panel 12. With the radiative cooling system, the panel maintains an operational temperature of about +7° C. to the ambient temperature of 25° C. at times of peak solar exposure in which an uncooled panel will reach temperatures in excess of 50° C. Additionally, the system moderates the temperature decrease of the panels during nighttime. The temperature moderation provides at least two distinct benefits: first, it enables the field use of photovoltaic materials that are sensitive to thermal cycling; and second, the reduction of thermal cycling extends the service life of the photovoltaic which helps lower the LCOE by providing a larger discount timeframe.

Referring to FIG. 1 and FIG. 2, in examples, a thermal management system 20 for a photovoltaic (PV) power generator 10 may include an infrared radiating element 22, a solar-scattering cover 24 disposed on the infrared radiating element 22; and a thermal storage sub-system 30 in fluid connection with a solar panel 12 via thermal interconnections 14.

In some examples, the solar-scattering cover 24 is to scatter sunlight 11 diffusely (as depicted at reference numeral 39) or directionally toward an underside 16 of the solar panel 12. The solar-scattering cover 24 may be substantially transparent to infrared radiation to allow the infrared radiating element 22 to emit infrared radiation through the solar-scattering cover 24. In some examples, the solar-scattering cover 24 may include a nanostructured, IR-transparent polymer 21. In some examples, the nanostructured, IR-transparent polymer 21 may be nanostructured polyethylene (nanoPE). In some examples, the nanostructured, IR-transparent polymer 21 may be nanostructured polyacrylonitrile (nanoPAN) 29. In some examples, the thermal management system 20 further includes a dielectric material disposed on or embedded in the nanostructured, IR-transparent polymer 21 to increase solar scattering of the solar-scattering cover 24 and to protect the nanostructured, IR-transparent polymer 21 from ultra-violet radiation. In some examples, the dielectric material is deposited on the nanostructured, IR-transparent polymer 21 by physical vapor deposition or by a solution-based process, or embedded into the nanostructured, IR-transparent polymer 21 by electrospinning. In some examples, the thermal storage sub-system 30 is to shift and distribute a peak solar heat load over a twenty-four hour time period; the thermal storage sub-system 30 is to store excess off-peak cooling for use during peak hours; the thermal storage sub-system 30 is to store natural convection energy; and the thermal storage sub-system 30 comprises a container 32 to store a coolant. In some examples, the container 32 is located under the infrared radiating element 22 or the container 32 is thermally connected to the infrared radiating element 22 via the thermal interconnections 14. In some examples, the container 32 is connected to the solar panel 12 with a circulating coolant line 28 or with heat pipes. In some examples, the heat pipes may be stationary, in other examples, the heat pipes may be to oscillate. In some examples, the thermal interconnections 14 include a circulating fluid loop or a heat pipe. In some examples, the thermal interconnections 14 are passive. As used herein, "passive," with respect to thermal interconnections means that the thermal interconnection is by natural circulation of air. The natural circulation of air may be directed by a structure (for example, a shroud or a vane), or the natural circulation may be undirected. In undirected natural circulation, there is open air between the container 32 and the infrared radiating element 22. In some examples, the dielectric material is selected from the group consisting of ZnS, ZnO, TiO2 and combinations thereof.

In some examples of the thermal management system 20, the solar panel 12 may be a member 43 of an array 13 of tracking solar panels arranged in rows 15. The infrared radiating element 22 may be a solar-scattering radiator 40 located between the rows 15 of the array 13 of tracking solar panels. A radiating area of the solar-scattering radiator 40 may be about equal to an area of the solar panel 12. The solar-scattering radiator 40 may be to work in tandem with natural convection 44 from the array 13 of tracking solar panels. The thermal storage sub-system 30 may include a ground-based liquid reservoir 34. In some examples, the thermal management system 20 further includes a sun-facing surface 23 defined on at least one member 43 of the array 13 of tracking solar panels, a distal surface 25 defined on the at least one member 43 of the array 13 of tracking solar panels opposite the sun-facing surface 23, and a heat exchanger 33 attached to the distal surface 25 of the at least one member 43 of the array 13 of tracking solar panels. In some examples, the heat exchanger 33 includes a serpentine tube 27, and the heat exchanger 33 is to obscure less than 20 percent of the distal surface 25 of the solar panel 12 to which the heat exchanger 33 is attached. In some examples, the array 13 of tracking solar panels includes at least one bifacial solar panel 12. In some examples, the thermal interconnections 14 include flexible tubing to fluidly connect the ground-based liquid reservoir 34 to the serpentine tube 27, wherein the flexible tubing remains connected to the serpentine tube 27 throughout a range of motion of a tracking solar panel 12 in the array 13 of tracking solar panels to which the serpentine tube 27 is attached.

In some examples of the thermal management system 20, the ground-based liquid reservoir 34 is covered by the solar-scattering radiator 40. In some examples, the solar-scattering radiator 40 includes: a layer of aluminum 31; a coating 45 disposed on the layer of aluminum 31, the coating 45 to absorb or emit radiation having wavelengths ranging from mid-wavelength infrared to long-wavelength infrared; and a solar scattering cover overlaid on the coating 45, wherein the solar scattering cover is substantially transparent to infrared radiation 26 to allow the solar-scattering radiator 40 to emit infrared radiation 26 through the solar-scattering cover 24. In some examples, the layer of aluminum 31 may have a mirror finish for specular reflection of the sunlight 11. In other examples, the layer of aluminum 31 may have a rough surface that causes diffuse reflection of the sunlight 11. As used herein, the reflection of light is categorized into two types of reflection: specular reflection is defined as light reflected from a smooth surface at a definite angle, and diffuse reflection, which is produced by rough surfaces that tend to reflect light in all directions. In some examples, the coating 45 is a selected from the group consisting of: polydimethylsiloxane (PDMS) or an other polymer; an inorganic material; and combinations thereof. In some examples, the coating 45 is polydimethylsiloxane (PDMS). In some examples, the solar-scattering cover 24 includes a nanostructured, IR-transparent polymer 21. In some examples, the nanostructured, IR-transparent polymer 21 is nanostructured polyethylene (nanoPE). In some examples, the nanostructured, IR-transparent polymer 21 is nanostructured polyacrylonitrile (nanoPAN) 29. In some examples, the thermal management system 20 further includes a dielectric material disposed on or embedded in the nanostructured, IR-transparent polymer 21 to increase solar scattering of the solar-scattering cover 24 and to protect the nanostructured, IR-transparent polymer 21 from ultra-violet radiation. In some examples, the dielectric material is deposited on the nanostructured, IR-transparent polymer 21 by physical vapor deposition or by a solution-based process, or embedded in to the nanostructured, IR-transparent polymer 21 by electrospinning. In some examples, the dielectric material is selected from the group consisting of ZnS, ZnO, TiO2 and combinations thereof.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

It is to be understood that the ranges provided herein include the stated range and any value or sub-range within the stated range, as if such value or sub-range were explicitly recited. For example, a range of from about 8 µm to about 15 µm should be interpreted to include not only the explicitly recited limits of about 8 µm to about 15 µm, but also to include individual values, such as 9 µm, 11.8 µm, etc., and sub-ranges, such as from about 10 µm to about 12 µm, etc. Furthermore, when "about" or "~" is utilized to describe a value, this is meant to encompass minor variations (up to +/−10%) from the stated value.

While several examples have been described in detail, it is to be understood that the disclosed examples may be modified. Therefore, the foregoing description is to be considered non-limiting. No language in this disclosure should be construed as indicating any unclaimed element as essential to the practice of the examples.

What is claimed is:

1. A thermal management system for a photovoltaic (PV) power generator, comprising:
   an infrared radiating element;
   a solar-scattering cover disposed on the infrared radiating element; and
   a thermal storage sub-system in fluid connection with a solar panel via thermal interconnections;
   wherein:
   the solar-scattering cover is to scatter sunlight diffusely or directionally toward an underside of the solar panel; and
   the solar-scattering cover is substantially transparent to infrared radiation to allow the infrared radiating element to emit infrared radiation through the solar-scattering cover.

2. The thermal management system as defined in claim 1 wherein the solar-scattering cover comprises a nanostructured, IR-transparent polymer.

3. The thermal management system as defined in claim 2 wherein the nanostructured, IR-transparent polymer is nanostructured polyethylene (nanoPE).

4. The thermal management system as defined in claim 2 wherein the nanostructured, IR-transparent polymer is nanostructured polyacrylonitrile (nanoPAN).

5. The thermal management system as defined in claim 2, further comprising a dielectric material disposed on or embedded in the nanostructured, IR-transparent polymer to increase solar scattering of the solar-scattering cover and to protect the nanostructured, IR-transparent polymer from ultra-violet radiation, wherein the dielectric material is deposited on the nanostructured, IR-transparent polymer by physical vapor deposition or by a solution-based process, or embedded into the nanostructured, IR-transparent polymer by electrospinning, wherein the dielectric material is selected from the group consisting of ZnS, ZnO, $TiO_2$ and combinations thereof.

6. A thermal management system for a photovoltaic (PV) power generator, comprising:
   an infrared radiating element;
   a solar-scattering cover disposed on the infrared radiating element; and a thermal storage sub-system in fluid connection with a solar panel via thermal interconnections;
wherein:
the thermal storage sub-system is to shift and distribute a peak solar heat load over a twenty-four hour time period;
the thermal storage sub-system is to store excess off-peak cooling for use during peak hours;
the thermal storage sub-system is to store natural convection energy; and
the thermal storage sub-system comprises a container to store a coolant.

7. The thermal management system as defined in claim 6 wherein the container is located under the infrared radiating element or the container is thermally connected to the infrared radiating element via the thermal interconnections.

8. The thermal management system as defined in claim 6 wherein the container is connected to the solar panel with a circulating coolant line or with heat pipes, wherein the heat pipes are stationary or wherein the heat pipes are to oscillate.

9. The thermal management system as defined in claim 1 wherein the thermal interconnections comprise a circulating fluid loop or a heat pipe.

10. The thermal management system as defined in claim 1 wherein the thermal interconnections are passive.

11. A thermal management system for a photovoltaic (PV) power generator, comprising:
an infrared radiating element;
a solar-scattering cover disposed on the infrared radiating element; and
a thermal storage sub-system in fluid connection with a solar panel via thermal interconnections;
wherein:
the solar panel is a member of an array of tracking solar panels arranged in rows;
the infrared radiating element is a solar-scattering radiator located between the rows of the array of tracking solar panels;
a radiating area of the solar-scattering radiator is about equal to an area of the solar panel;
the solar-scattering radiator is to work in tandem with natural convection from the array of tracking solar panels; and
the thermal storage sub-system includes a ground-based liquid reservoir.

12. The thermal management system as defined in claim 11, further comprising:
a sun-facing surface defined on at least one member of the array of tracking solar panels;
a distal surface defined on the at least one member of the array of tracking solar panels opposite the sun-facing surface; and
a heat exchanger attached to the distal surface of the at least one member of the array of tracking solar panels, wherein:
the heat exchanger includes a serpentine tube; and
the heat exchanger is to obscure less than 20 percent of the distal surface of the solar panel to which the heat exchanger is attached.

13. The thermal management system as defined in claim 11 wherein the ground-based liquid reservoir is covered by the solar-scattering radiator, wherein the solar-scattering radiator includes:
a layer of mirrored aluminum;
a coating disposed on the layer of mirrored aluminum, the coating to absorb or emit radiation having wavelengths ranging from mid-wavelength infrared to long-wavelength infrared, wherein the coating is a selected from the group consisting of: polydimethylsiloxane (PDMS) or an other polymer; an inorganic material; and combinations thereof;
a solar scattering cover including a nanostructured, IR-transparent polymer including nanostructured polyethylene (nanoPE) or nanostructured polyacrylonitrile (nanoPAN) overlaid on the coating, wherein the solar scattering cover is substantially transparent to infrared radiation to allow the solar-scattering radiator to emit infrared radiation through the solar-scattering cover; and
a dielectric material disposed on or embedded in the nanostructured, IR-transparent polymer to increase solar scattering of the solar-scattering cover and to protect the nanostructured, IR-transparent polymer from ultra-violet radiation, wherein the dielectric material is deposited on the nanostructured, IR-transparent polymer by physical vapor deposition or by a solution-based process, or embedded in to the nanostructured, IR-transparent polymer by electrospinning, and wherein the dielectric material is selected from the group consisting of ZnS, ZnO, $TiO_2$ and combinations thereof.

* * * * *